(12) United States Patent
Ermilios

(10) Patent No.: US 10,163,226 B2
(45) Date of Patent: Dec. 25, 2018

(54) ONLINE CALIBRATION OF A MOTOR VEHICLE CAMERA SYSTEM

(71) Applicant: Connaught Electronics Ltd., Tuam, County Galway (IE)

(72) Inventor: Pantelis Ermilios, Wensin (DE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 15/521,909

(22) PCT Filed: Nov. 26, 2015

(86) PCT No.: PCT/EP2015/077735
§ 371 (c)(1),
(2) Date: Apr. 26, 2017

(87) PCT Pub. No.: WO2016/087298
PCT Pub. Date: Jun. 9, 2016

(65) Prior Publication Data
US 2017/0323459 A1   Nov. 9, 2017

(30) Foreign Application Priority Data

Dec. 4, 2014  (DE) .................. 10 2014 117 888

(51) Int. Cl.
*G06K 9/00* (2006.01)
*G06T 7/80* (2017.01)
(52) U.S. Cl.
CPC ...... *G06T 7/80* (2017.01); *G06T 2207/10016* (2013.01); *G06T 2207/30252* (2013.01)
(58) Field of Classification Search
None
See application file for complete search history.

(56) References Cited

U.S. PATENT DOCUMENTS 6,757,328 B1   6/2004  Huang et al.
9,792,683 B2 * 10/2017  Bone .................. B60R 1/00
(Continued)

FOREIGN PATENT DOCUMENTS

DE   102010062297 A1   6/2012
WO   2010/038224 A1    4/2010
(Continued)

OTHER PUBLICATIONS

International Search Report issued in PCT/EP2015/077735 dated Feb. 10, 2016 (5 pages).
(Continued)

*Primary Examiner* — Vikkram Bali
(74) *Attorney, Agent, or Firm* — Osha Liang LLP

(57) ABSTRACT

The invention relates to a method for calibrating a camera system (7) of a motor vehicle (1). At least one camera (8-11) respectively sequentially generates camera images (21-28) from an environment (2) of the motor vehicle (1). A computing device (12) generates a virtual view (14) of the environment (2) from a virtual perspective from the camera images (21-28) by means of a projection (P). In traveling, the computing device (12) passes at least once a calibration cycle for each camera (8-11). Based on current projection parameters (30) of the projection (P), therein, camera images (23, 24) of the camera (9) are transformed. Motion vectors are determined from it. For at least one geometric characteristic of the motion vectors, a reference value is set. From a difference between the at least one geometric characteristic of the motion vectors and the respective corresponding reference value, an error value is determined. Depending on the error value, new projection parameters are determined (30).

13 Claims, 6 Drawing Sheets

(56) References Cited

U.S. PATENT DOCUMENTS

Figure 1:
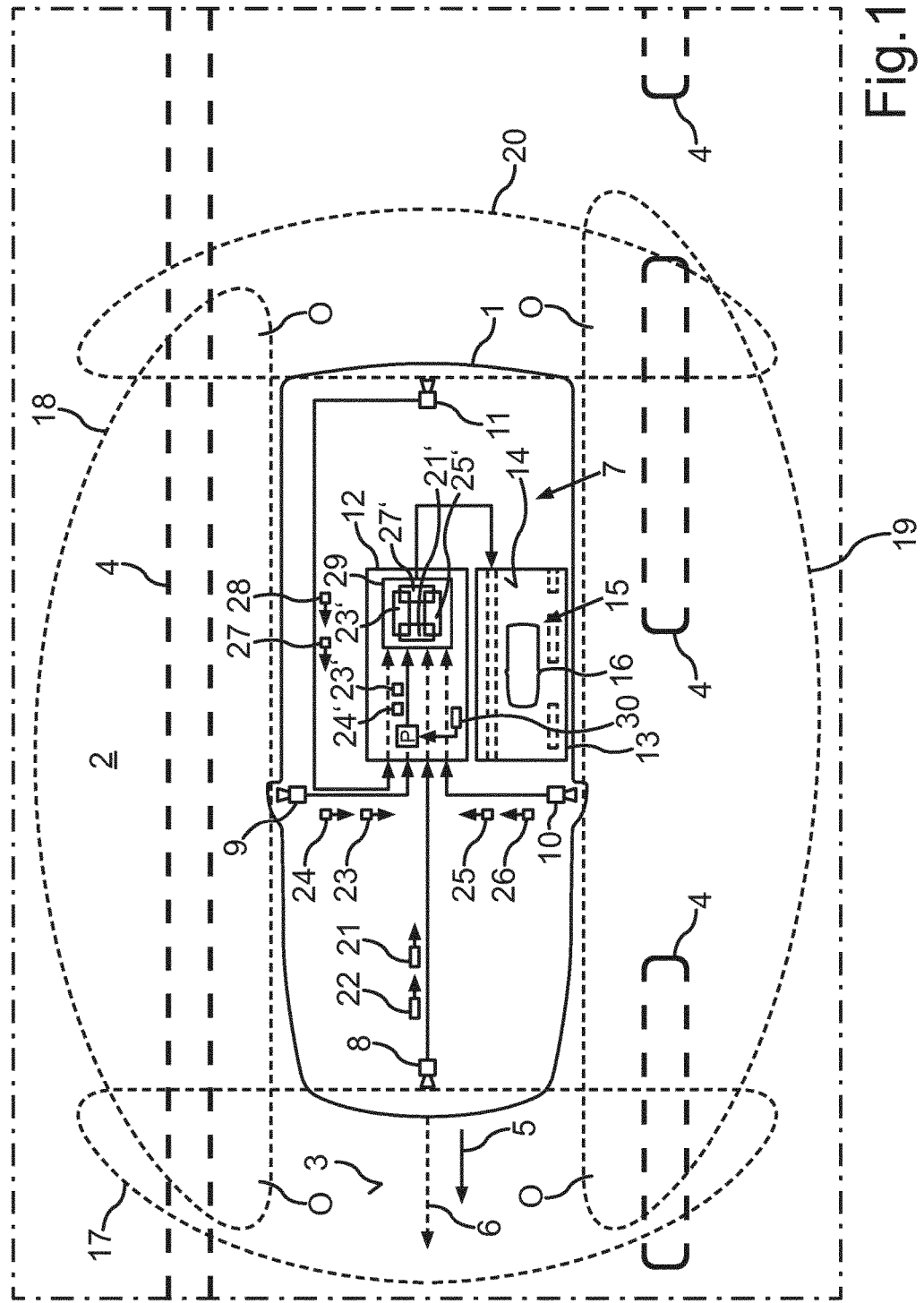

2007/0047940 A1  3/2007  Matsumoto et al.
2014/0350834 A1  11/2014  Turk

FOREIGN PATENT DOCUMENTS

WO    2012/139636 A1    10/2012
WO    2012/143036 A1    10/2012

OTHER PUBLICATIONS

Written Opinion of the International Searching Authority issued in PCT/EP2015/077735 dated Feb. 10, 2016 (7 pages).

* cited by examiner

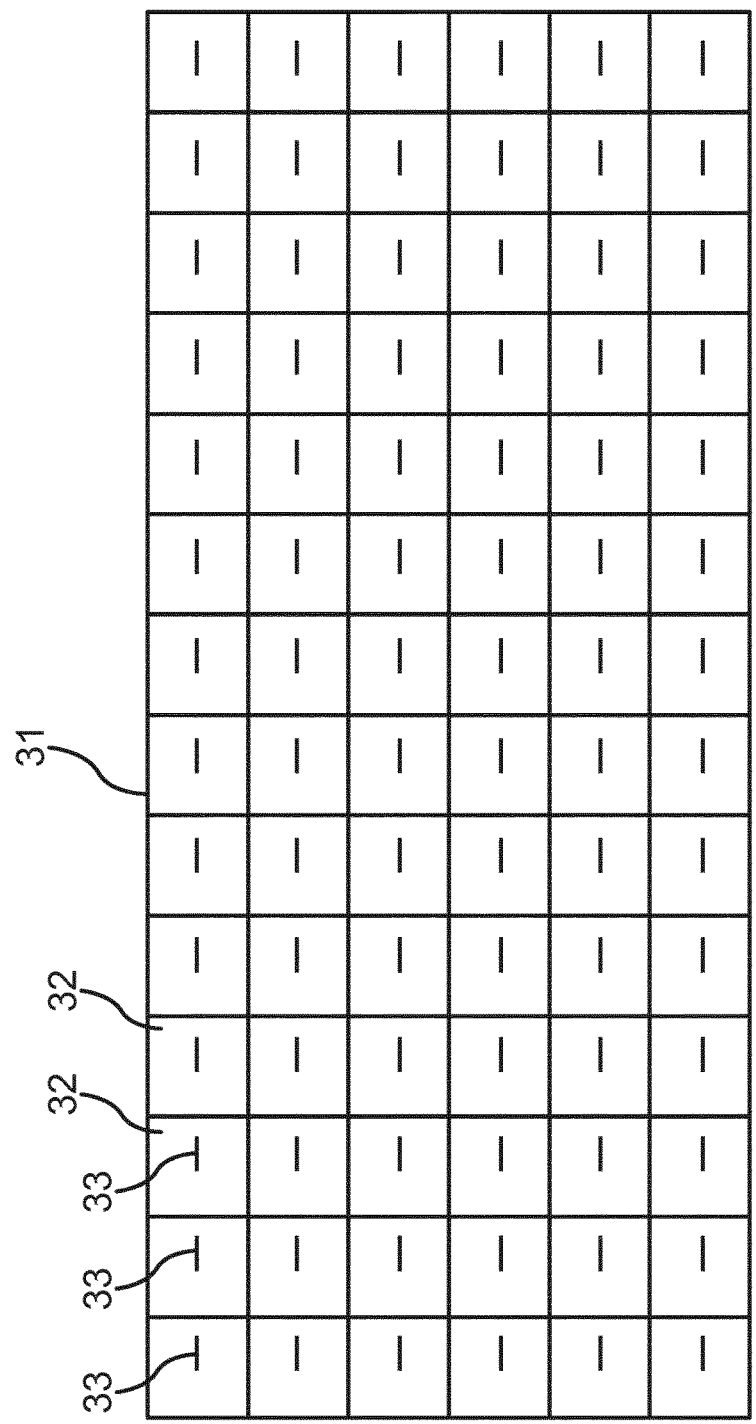

ONLINE CALIBRATION OF A MOTOR VEHICLE CAMERA SYSTEM

The invention relates to a camera system for a motor vehicle and to a method for calibrating the camera system. The camera system has at least one camera, which generates an image sequence from camera images, thus video images, from an environment of the motor vehicle. A computing device of the camera system respectively generates a virtual view of the environment from a predetermined virtual perspective, for example a plan view of the environment, from the camera images of the at least one camera.

The invention provides a method for online calibration of a vehicle video system based on motion estimation that is performed on fisheye and perspective corrected image frames of the ground surface captured by one or more cameras while the vehicle is in motion. The method can estimate the spatial orientation of each camera (pitch-yaw-roll) relative to the direction of the vehicle motion and the ground plane. It can also estimate the height of each camera relative to the ground plane. In addition, it can provide a refinement of these parameters to further optimize the stitching quality of the virtual plan view generated by the video system.

For generating the virtual view, each camera image is transformed by means of a transformation or projection. This projection has to consider the spatial orientation or spatial direction of each camera, thus the actual perspective of the respective camera to the environment. The spatial orientation of a camera is for example described by its viewing angle, yaw angle and/or roll angle. The spatial orientation of each camera determines the projection parameters of the projection, by which a camera image is transformed from the actual perspective into the virtual perspective. These projection parameters have to be adapted to the actual spatial orientation of each camera by a calibration.

A method for calibrating a camera system of a motor vehicle is known from WO 2012/139636 A1. Therein, in a sequence of multiple transformed camera images of a virtual view, a motion trajectory of at least two features of the environment determined in the transformed camera images is determined. The motion trajectories result in a geometric figure, which is compared to a parallelogram. With this method, an incorrectly adjusted pitch, yaw and roll angle of a camera (relative to the ground plane and the direction of motion) can be compensated for.

The invention is based on the object to perform a calibration of the spatial orientation and Z position (height) of each camera in a motor vehicle camera system relative to the vehicle longitudinal axis and the ground plane.

The object is solved by the subject matters of the independent claims. Advantageous developments of the invention are apparent by the features of the dependent claims.

According to the invention, a method for calibrating a camera system of a motor vehicle is provided. Therein, the following camera system is taken as a basis. At least one camera of the camera system respectively sequentially generates camera images from an environment of the motor vehicle. A computing device of the camera system respectively generates a virtual view of the environment from a predetermined virtual perspective respectively from the camera images by means of a projection. In particular, the virtual perspective is a plan view of the environment, thus a bird's eye view. The transformed camera images overall formed to each camera are preferably composed or combined to an overall view, in particular an all-around view. In particular with a plan view, a bird's eye view to the environment of the motor vehicle results, which completely surrounds the motor vehicle. The virtual view can for example be displayed on a display device, e.g. a screen, as a display image. Hereby, a parking assistance can be provided.

The method according to the invention includes the following steps. The computing device recognizes a motion of the motor vehicle along a preset direction of motion. In particular, a straight vehicle motion, thus a straight-ahead travel, is recognized. With recognized travel along the direction of motion, the computing device respectively passes a calibration cycle at least once for each camera.

In each calibration cycle, the computing device performs the following steps. Based on current projection parameters of the projection, two of the camera images of the respective camera are transformed. Each transformed camera image thus represents the environment from the predetermined virtual perspective. Because the motor vehicle executes the motion, the two camera images differ in that image features of a first one of the two transformed camera images are shifted by a distance depending on the motion in the second transformed camera image. However, only features in real space are shifted uniformly by the same amount due to the linear motion approximation. Due to the perspective errors of the yet-uncalibrated system and hence virtual view (e.g. plan view), the shift is not uniform for the image features measured across the image, i.e. their motion vectors are not identical. By connecting each one image feature in the first transformed camera image to the same image feature in the second transformed camera image, a motion vector respectively results. Based on the transformed camera images, thus, multiple motion vectors are determined in the virtual view. Therein, each motion vector in particular describes a length of motion and/or a direction of motion and the perspective error of the virtual plan view of an uncalibrated system. For straight motion at least two motion vectors reasonably spaced apart in the lateral direction are needed to compute the pitch-yaw-roll angles for each camera. In practice more motion vectors are required to be able to detect and reject outliers. With the inventive method one obtains these motion vectors from the same frame. It would also be feasible to obtain them in different frames in which case at least one motion vector would be required in each frame.

For at least one geometric characteristic of the motion vectors, in particular a length and/or direction, a respective reference value is set depending on the direction of motion. In other words, based on the direction of motion, it is determined which geometric characteristics the motion vectors should have. Thus, a nominal motion vector or reference vector can for example be determined depending on the direction of motion. For example, the reference vector can have a nominal length and/or a nominal direction. From a difference between the at least one geometric characteristic of the motion vectors and the respective corresponding reference value, for example the reference value for the length and/or direction, an error value is determined. In other words, a deviation of the motion vectors from the reference vector is determined. Depending on the error value, new projection parameters are determined from the current projection parameters. The mentioned error value can for example be formed as a sum of the absolute errors, sum of the squared errors or similar methods. For example, the difference of the actual value of a motion vector and the reference value can be formed for each geometric characteristic.

By the invention, the advantage arises that not only a roll angle, but for example also an incorrectly adjusted pitch angle and/or yaw angle of the camera can be compensated for by adapting the projection parameters, thus by determining the new projection parameters, for each camera based on the motion vectors in the virtual view. A roll angle is a rotational position of the camera around its optical axis or the vehicle transverse axis according to the rotation scheme employed. A yaw angle describes a rotational position of the camera around a vehicle vertical axis. A pitch angle describes a rotational position of the camera around a vehicle transverse axis. By vehicle vertical axis (Z-axis), vehicle longitudinal axis (X-axis) and vehicle transverse axis (Y-axis), the usual designations known in context of the motor vehicle technology are to be understood. It is typical in automotive to have X as the longitudinal axis and Y as the transverse axis—this convention is used here.

The mentioned projection can for example be a perspective transformation as it is known from the prior art. The computing device can for example be provided by a controller or an assembly of several controllers or by a DSP (Digital Signal Processor) or a central processor device of the motor vehicle. Each motion vector can be determined in an image pair of two transformed camera images based on corresponding image features. In order to detect and associate such image features with each other, e.g. a SIFT algorithm (SIFT—Scale-invariant feature transform) or a SURF algorithm (SURF—Speeded Up Robust Features) can be provided. Such a feature detection and matching provides feature pairs of each one image feature from the first transformed camera image and an image feature from the second transformed camera image, wherein the image features optically correspond to each other. Preferably instead of a feature detector like SIFT or SURF, one can perform direct correlation of a predefined number of image blocks (arrangement on a grid) between the two frames of interest and reject motion vectors that deviate from the local trend in the motion field for more than a threshold. This is a fundamentally different approach from using a feature detector and waiting for good features to appear in the image that can be matched in the next frame. This tracking method is in principle very similar to motion estimation used for video compression. This does not mean that it is not possible to use advanced feature detectors such as SIFT or SURF (and many others) to match features but that could be an overkill since the virtual plan view provides automatically the required shift and scale invariance (up to some tolerance) for the matched blocks. However, to enhance tracking performance one can run a band-pass filter on the two virtual plan views before matching them, such as a Laplacian of Gaussian or Difference of Gaussians. This gives substantial improvement in low-light and/or poor weather conditions.

In a preferred embodiment, at least one spatial orientation of the at least one camera, in particular a pitch angle (pitch) and/or a yaw angle (yaw) and/or a roll angle (roll), is described by the projection parameters, in particular the new projection parameters. Additionally or alternatively to this, an installation height of the camera in the motor vehicle is described by the projection parameters, in particular the new projection parameters. By the spatial orientation and/or the installation height being calibrated or adapted as the new projection parameters, an image motion of the image features arises in the virtual view, which corresponds to the direction of motion of the motor vehicle. In particular with a straight-ahead travel of the motor vehicle, the pixels in the virtual view move straight and in particular edge-parallel to the edges of the display image, that is not transversely or diagonally across the display device.

In an embodiment, the at least one camera captures a travel ground as the environment, and the motion vectors are determined based on a texture of the travel ground. Hereby, the advantage arises that the method can be formed independently of special image features such as corners, contours or edges. Hereby, the motion vectors can be formed independent of situation.

In an embodiment, multiple motion vectors per camera are determined in the virtual view. To this, each transformed camera image can be divided into a matrix of image blocks adjoining to each other or overlapping. For each image block, a motion vector is determined. Hereby, the advantage arises that the error value is determined based on a plurality of motion vectors, which are disposed distributed over the entire transformed camera image. Hereby, the error becomes statistically more robust. Statistic outliers can also be compensated for. Note that the at least two motion vectors are obtained from the same pair or different pairs of transformed images, spaced apart in the lateral direction, in order to compute pitch-yaw-roll angles.

In an embodiment, the error value is iteratively reduced in each calibration cycle. To this, intermediate projection parameters are determined by means of a predetermined cost function in each iteration depending on the error value. The cost function is the calculation rule for the error value. The intermediate projection parameter can for example be determined based on a mathematical derivation of a cost function. The mathematical derivation can be used to determine a gradient for the projection parameters, with which an iterative optimization method can be performed in a manner known per se, e.g. a Gauss-Newton method. It would also be possible to formulate the problem as an over-determined system of linear equations and solve with linear least squares techniques. Based on the intermediate projection parameters, the motion vectors in the virtual view are adapted or newly oriented by newly transforming by means of the projection, i.e. re-projecting. Herein, in particular only the motion vectors are projected. That is, a new projection of the camera images and recalculation of the motion vectors can be omitted.

This saves computational power. An iteration is hereby terminated. The iterations are repeated until the error value satisfies a predetermined optimization criterion. For example, the optimization criterion can preset that the error value must be less than a predetermined maximum value or that the error value has varied by a value related to the prior iteration, which is less than a predetermined minimum variation. By the embodiment, the advantage arises that optimum new projection parameters in terms of the optimization criterion can be determined based on only two camera images.

In an embodiment, multiple motion vectors are determined e.g. in the described manner. As a travel along the direction of motion, a straight-ahead travel, thus a rectilinear motion of the motor vehicle, is recognized. Hereby, geometric characteristics of the motion vectors advantageously result, which can be particularly simply and reliably checked and/or optimized. As the geometric characteristic, it is checked if the motion vectors are parallel to each other and/or parallel to an image edge of the virtual view and/or identically long. With a straight motion of the motor vehicle, these geometric characteristics are sufficient to calibrate each camera with respect to roll angle, yaw angle and/or pitch angle.

In order to check the mentioned geometric characteristics in a straight motion of the motor vehicle, there is a particularly preferred embodiment. Herein, for a y component of each motion vector oriented parallel to the vehicle transverse axis, the y reference value 0 is set, and for an x component oriented parallel to the vehicle longitudinal axis, an average value of all of the x components of the motion vectors is set as the x reference value. The sum of the squared differences is formed as the error value. The difference is calculated between the actual value of the y component and the y reference value on the one hand and the difference of the actual value of the x component and the x reference value in the described manner. Hereby, the advantage arises that the described iterative minimization according to the optimization criterion can be particularly computationally efficiently performed by means of the error value. At the same time, it is achieved that all of the directional vectors are identically long and oriented parallel to the direction of travel.

In an embodiment, for selecting the two camera images from the image sequence of the respective camera, at least one camera image of the image sequence is skipped between the first of the two camera images and the second of the two camera images. Hereby, the advantage arises that the at least one directional vector has a vector length, which is greater than a minimum length. This embodiment is in particular performed with a travel speed of the motor vehicle, which is less than a minimum speed. The minimum speed is in particular in a range from 2 km/h to 25 km/h. It can be provided that a calibration cycle is only performed if a travel speed of the motor vehicle is in a predetermined speed interval. The speed interval is for example 10 km/h to 30 km/h, in particular 15 km/h to 25 km/h. Principally, there are no restrictions except from speed greater than zero.

If multiple motion vectors are determined per camera, in an embodiment, at least one motion vector is deleted as an outlier. A motion vector is classified as an outlier, if an input or contribution to the error value is greater than a predetermined maximum value or maximum portion in the motion vector. Additionally or alternatively to this, a motion vector is classified as an outlier, if the motion vector violates a similarity criterion with respect to the remaining motion vectors in its immediate vicinity. One should only compare with neighboring vectors. The perspective distortion of an un-calibrated virtual view causes naturally large deviations between distant motion vectors. Preferably, flat ground is assumed in the cost function. Uneven ground (including kerbs) actually injects error in the calibration therefore one should employ a mechanism to detect it and discard it when it occurs. However when the ground is flat but inclined one cannot differentiate it from non-inclined ground. In most cases such errors are averaged out naturally over multiple calibration cycles. The detection mechanism for non-flat ground (such as kerbs) is to detect the sudden change in the length of the motion vectors that are on different ground level. The perspective error of an un-calibrated system causes a uniform change in the length the motion vectors however kerbs cause a sharp change that can be detected. Note that the vector length is directly related to object height in a calibrated system. That means that higher ground gives apparent larger motion in the virtual plan view and hence longer motion vectors.

In an embodiment, multiple calibration cycles are performed per camera. For each calibration cycle, new projection parameters are respectively determined. From the different calibration types, the corresponding new projection parameters are combined to a respective averaged projection parameter. For example, this can be performed by means of recursive averaging (moving average). In other words, the projection parameters are smoothed. Recursive averaging is for example possible by means of a filter, which is realized as an IIR filter (IIR—Infinite Impulse Response), for example an exponentially declining impulse response. The averaged projection parameters are taken as a basis as current projection parameters of the projection in the respectively next calibration cycle. Hereby, the advantage arises that the calibration fast converges. In addition, estimation errors in determining the projection parameters are compensated for.

In an embodiment, multiple calibration cycles are performed and an average error value is determined from the error value of one of the calibration cycles and from a respective error value of at least one prior calibration cycle. The new projection parameters are only determined if the average error value is greater than a predetermined threshold value. Otherwise, the calibration cycle is terminated without new projection parameters being determined. Hereby, a trigger function for the calibration results. For example, the error value can be determined multiple times for each one pair of camera images and hereby an error signal can be continuously provided. If the error signal exceeds a trigger value or threshold value, the actual calibration is performed by determining new parameter values until the average error value has again decreased below the threshold value. Herein, a hysteresis threshold value can also be provided.

As already explained, multiple cameras can generate camera images. The transformed camera images of the multiple cameras can then be combined or composed to an overall view, in particular an all-around view. In an embodiment, in which multiple cameras each generate camera images, the motion vectors formed to each camera are matched to each other. It is fact that all the motion vectors obtained simultaneously from the all cameras should have the same length after the pitch-yaw-roll error of each camera has been compensated since they describe the same amount of straight motion. One can use this information to adjust cooperatively the height of each camera in order to achieve equal length motion vectors in all cameras. This technique takes into account the known and fixed spatial position of the cameras that are mounted on the chassis of the vehicle and allows the cameras to deviate from that in a constrained manner by rotating or elevating the chassis from the four suspension points—which is what happens in reality. In order to calibrate without prior knowledge of the camera positions on the vehicle or a single camera system one can use an independent measurement of the amount of the vehicle motion from other sensors, such as the vehicle speed published on the CAN or FlexRay bus. From that one can compute the expected length of the motion vectors had the camera heights been correct and compensate for any error. The matching is effected by adjusting an installation height of at least one of the cameras as a projection parameter. In an embodiment, a relative installation height between two cameras is adjusted until the motion vectors for all cameras are coincident or differ at most in a predetermined tolerance value. In an embodiment, one of the cameras is subsequently absolutely calibrated. To this, an absolute installation height of the camera is determined depending on a travel speed of the motor vehicle. Depending on the travel speed, a reference value for a vector length of the motion vectors can be determined for this camera. For example, the travel speed can be determined via a communication bus of the motor vehicle, in particular a CAN bus (CAN—Controller Area Network). It can also be provided that an absolute installation height is determined at each camera in the described manner.

In the following, three possibilities are described, which each present an embodiment of the invention and in particular allow iterative calibration of the projection parameters to adapt the transformed camera images of two cameras. A first and a second camera generate camera images. In the transformed camera images of the two cameras, an overlap error value is determined. The new projection parameters for the first and/or the second camera are determined depending on the overlap error value. The three described embodiments arise by the following different calculation of the overlap error value.

In an alternative embodiment, at least one inter-camera motion vector is determined based on a transformed camera image of the first camera and a transformed camera image of the second camera. In other words, a starting point of the inter-camera motion vector in the transformed camera image of the first camera and an end point of the inter-camera motion vector in the transformed camera image of the second camera are determined. The overlap error is formed depending on at least one geometric characteristic of the at least one inter-camera motion vector. In particular in straight-ahead traveling, as the geometric characteristic, it is checked if the inter-camera motion vector is oriented parallel to the direction of motion of the motor vehicle.

In an alternative embodiment, in an overlapping region of transformed camera images an image block is determined in a transformed camera image of the first camera. An image block is an image area, in which an image feature is located, which was detected by feature detection. In a transformed camera image of the second camera, a corresponding image block is determined. In other words, the image block in the transformed camera image of the second camera is again detected. The image block is in particular a texture block. The feature is correspondingly a specific texture. The overlap error value is determined depending on a distance of the two image blocks. In this block matching, the overlap error value is reduced by the new projection parameters such that the distance is reduced.

In an alternative embodiment, in the overlapping region a comparative value is generated from a transformed camera image of the first camera and a transformed camera image of the second camera in the overlapping region. The comparative value can for example be a correlation value. For example, the brightness values of the pixels in the overlapping region of the two transformed camera images can be subtracted from each other and the sum of the squares of the differences can be formed. The overlap error value is determined depending on the comparative value. In particular, the comparative value is used as the overlap error value. Hereby, the new projection parameters are determined based on a texture correlation in the overlapping region.

A camera system for a motor vehicle, i.e. a camera device for a motor vehicle, is also associated with the invention. The camera system has at least one camera for respectively generating an image sequence from camera images of an environment of the motor vehicle. Preferably, multiple cameras are provided. Furthermore, a computing device is provided, which is adapted to respectively generate a virtual view of the environment from a predetermined virtual perspective, in particular a plan view of the environment, from the camera images by means of a projection. In particular, it is provided that the computing device generates a transformed camera image based on each one camera image of each camera and connects the transformed camera images to an overall view, in particular an all-around view. The camera system according to the invention furthermore has a display device for displaying the virtual view generated from the camera images, thus for displaying the transformed camera images. In particular, an overall view composed of the transformed camera images, preferably the plan view of the motor vehicle, is generated and displayed. In the camera system according to the invention, the computing device is adapted to perform an embodiment of the method according to the invention.

Furthermore, a motor vehicle with an embodiment of the camera system according to the invention is associated with the invention. Herein, it is preferably provided that the camera system has multiple cameras and a capturing range of a first one of the cameras is oriented to a first lateral region beside the motor vehicle, a capturing range of a second one of the cameras is oriented to a second lateral region opposing the first lateral region beside the motor vehicle, a capturing range of a third one of the cameras is oriented to a front region in front of the motor vehicle and a capturing range of a fourth one of the cameras is oriented to a rear region behind the motor vehicle. Preferably, the camera system is adapted to generate a respective transformed camera image from each one camera image of each camera. The transformed camera images thus generated are linked to an all-around view, in particular a plan view. That is, an all-around view is generated from the transformed camera images. The all-around view is displayed by means of the display device. The display device can for example be a screen for example for a center console or a dashboard of the motor vehicle.

Figure 2:
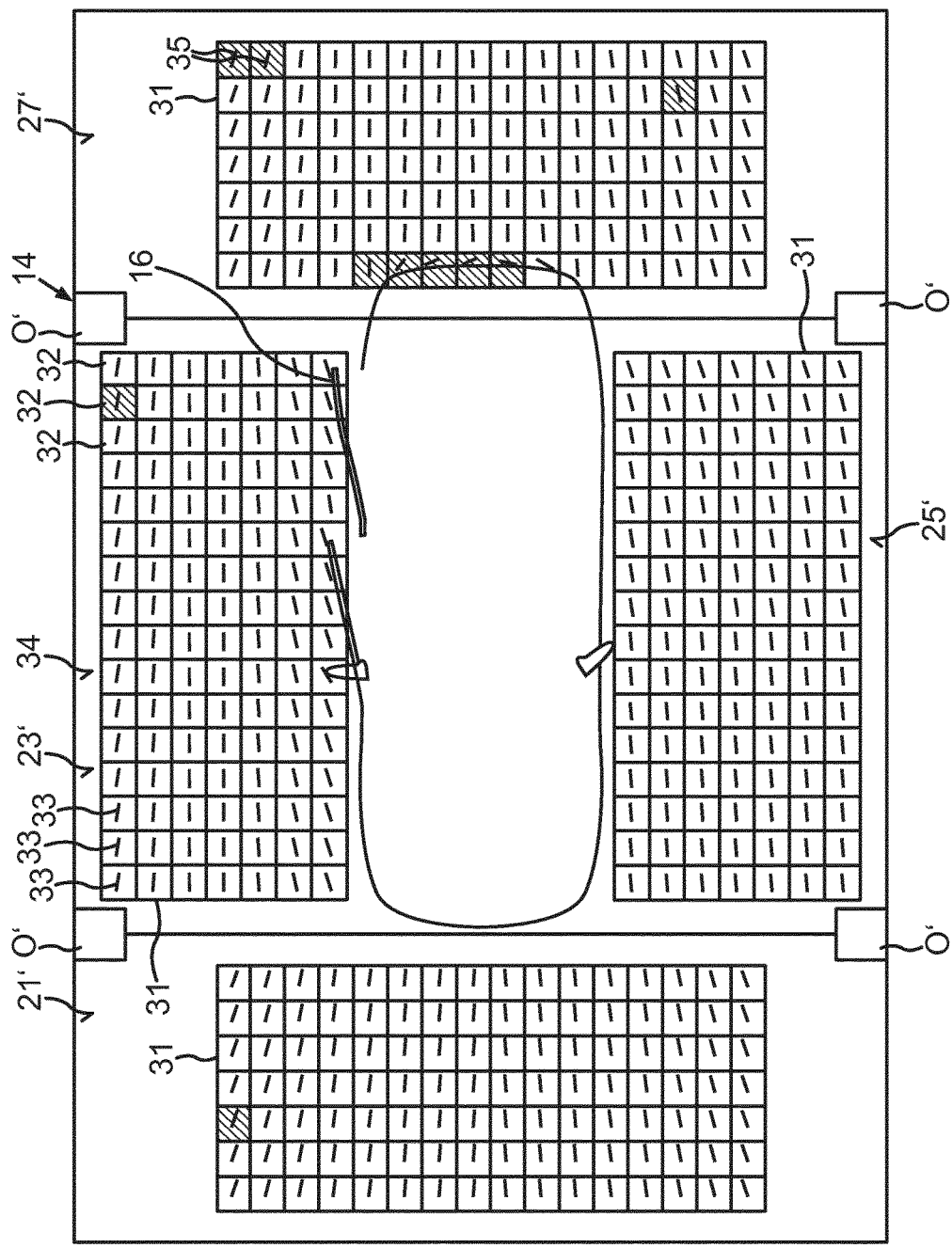
Figure 3:
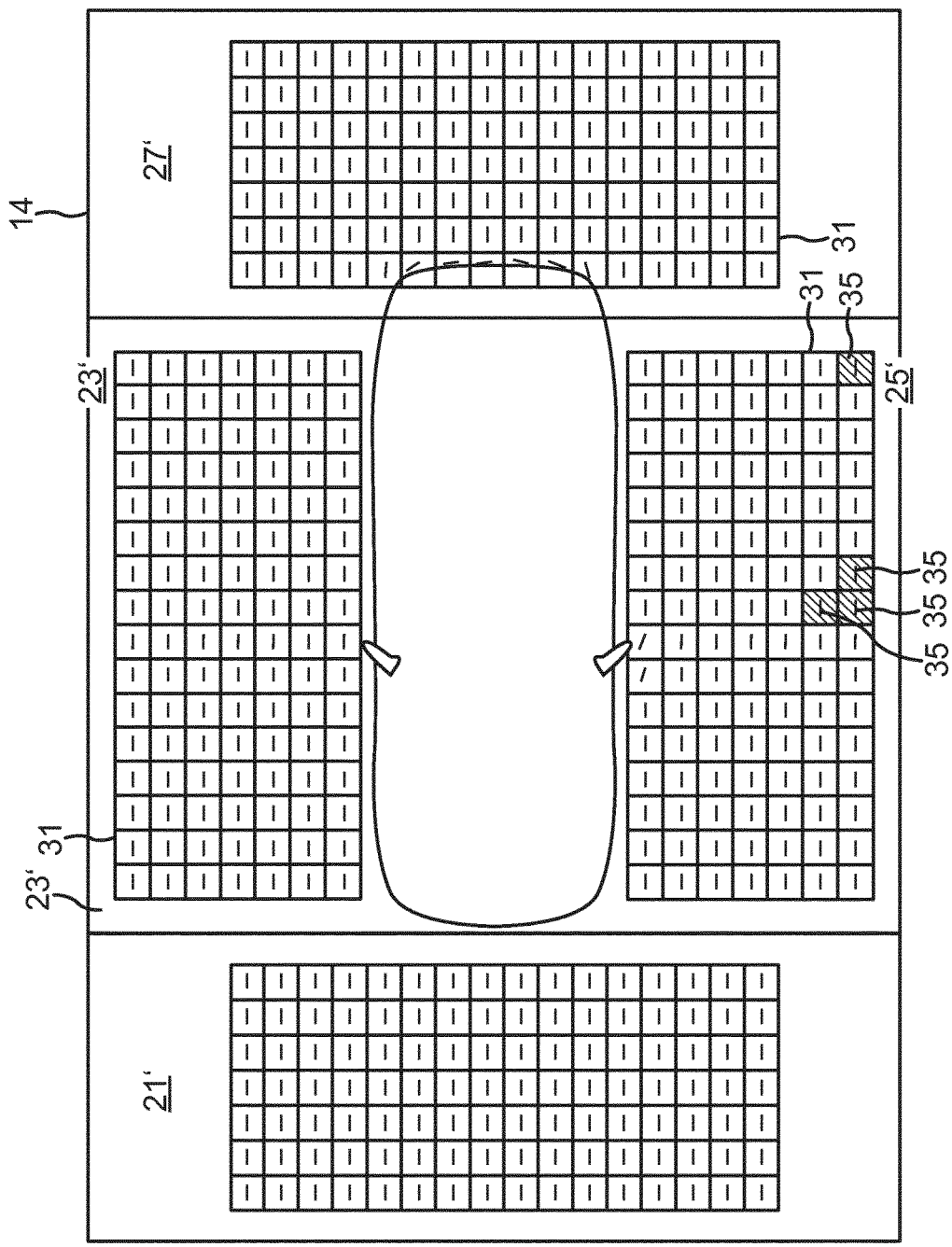
Figure 4:
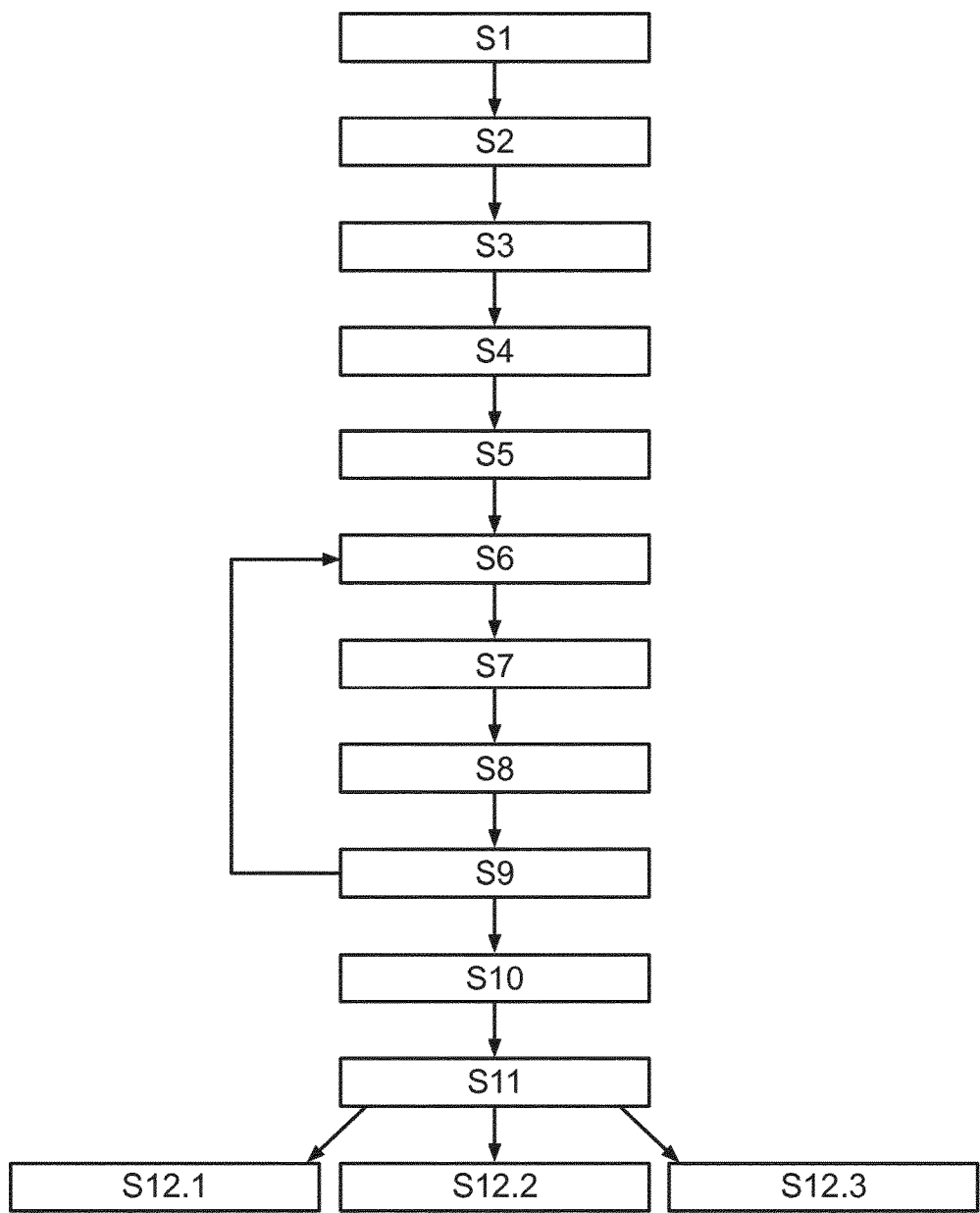
Figure 5:
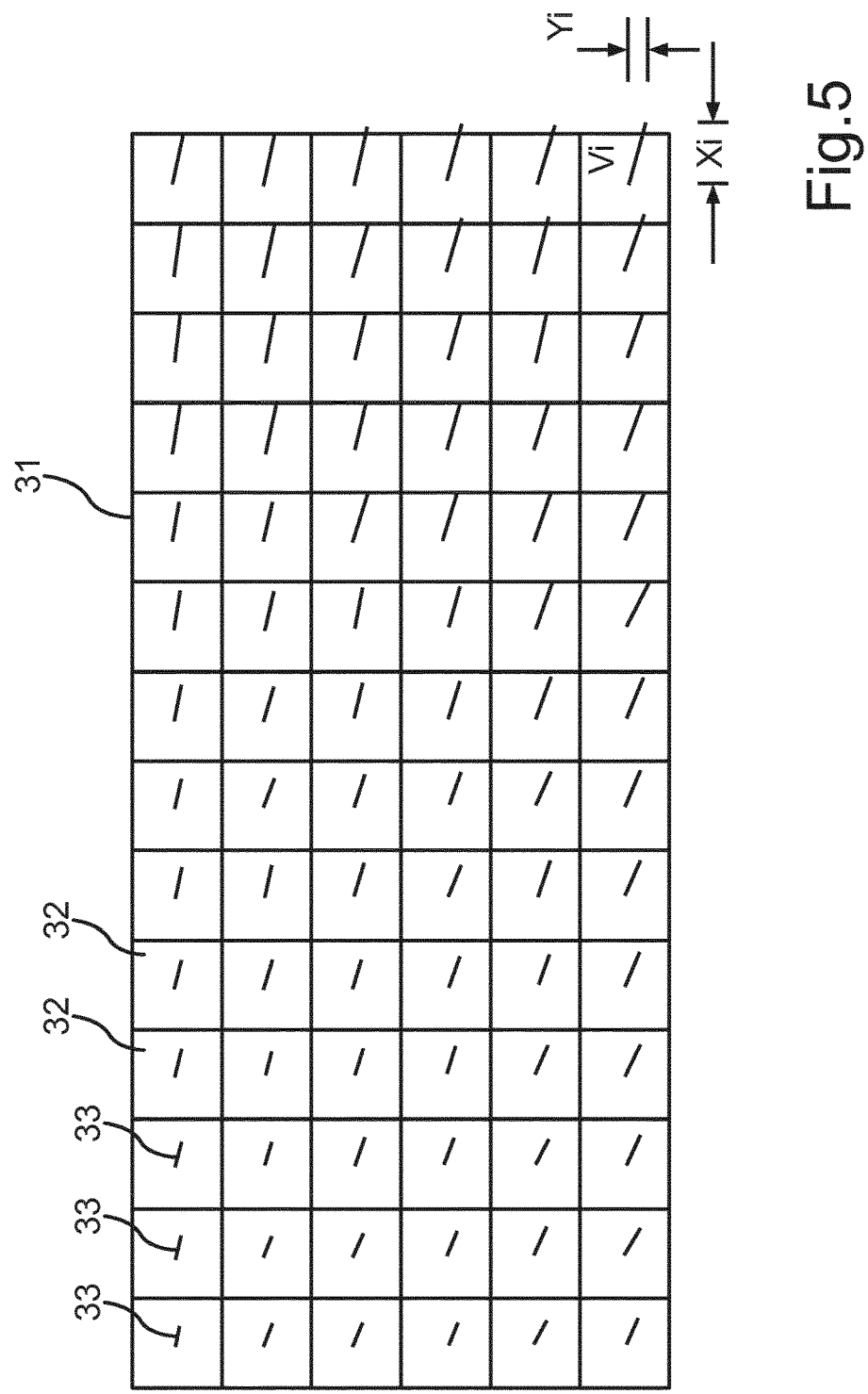

In the following, an embodiment of the invention is described. There show:

FIG. 1 a schematic illustration of an embodiment of the motor vehicle according to the invention, FIG. 2 a schematic illustration of a display image of a virtual plan view, which was generated by a camera system of the motor vehicle of FIG. 1 before a calibration, FIG. 3 the plan view of FIG. 2 after a calibration of the camera system, FIG. 4 a flow diagram to an embodiment of the method according to the invention, FIG. 5 motion vectors from a camera image of a camera of the camera system, and FIG. 6 the motion vectors of FIG. 4 after a calibration.

The embodiment explained in the following is a preferred embodiment of the invention. However, in the embodiment, the described components of the embodiment each represent individual features of the invention to be considered independently of each other, which each develop the invention also independently of each other and thereby are also to be regarded as a component of the invention in individual manner or in another than the shown combination. Furthermore, the described embodiment can also be supplemented by further features of the invention already described.

In the figures, functionally identical elements are each provided with the same reference characters.

FIG. 1 shows a motor vehicle 1, which can be an automobile, in particular a passenger car. In the example shown in FIG. 1, the motor vehicle 1 can travel through an environment 2. For example, the motor vehicle 1 can roll or travel over a travel ground 3, which can be a road. Lane bounding lines 4 are exemplarily illustrated of the road in FIG. 1. The motor vehicle 1 can travel along a forward direction of travel 5 over the travel ground 3. For the example, it is assumed that the motor vehicle 1 performs a rectilinear vehicle motion 6.

The motor vehicle 1 can have a camera system 7. The camera system 7 can have one or multiple cameras 8, 9, 10, 11. In the shown example, the camera 8 can be a front camera, the camera 9, 10 can be a respective lateral camera and the camera 11 can be a rear camera. Each camera 8, 9, 10, 11 can for example be a video camera. For example, each camera 8, 9, 10, 11 can respectively be configured as an infrared image camera, monochrome camera or color image camera. Each camera 8, 9, 10, 11 can be coupled to a computing device 12, which can for example be realized by a controller. The computing device 12 can be adapted to receive respective image data of each camera 8, 9, 10, 11. The computing device 12 can be coupled to a display device 13, which can for example be a screen, which can for example be disposed in a motor vehicle interior, for example on a center console or a dashboard. The computing device 12 can be adapted to generate a display image 14 from the camera images, which the computing device 12 can display on the display device 13.

For example, it can be provided that the display image 14 shows a virtual plan view 15 of the motor vehicle 1. To this, a picture 16 of the motor vehicle 1 can also be displayed in the display image 14. The display image 14 can be a moved image, thus a video sequence or image sequence.

The virtual plan view 15 can be generated in the camera system 7 as follows. A respective image capturing range or briefly capturing range 17, 18, 19, 20 of each camera 8, 9, 10, 11 can be oriented into the environment 2. In particular, each capturing range 17, 18, 19, 20 can be oriented to the travel ground 3 such that each camera 8, 9, 10, 11 images the travel ground 3 from a respective actual camera perspective, for example from an installation height in a range between 20 centimeters and 150 centimeters, in its consecutive camera images 21, 22, 23, 24, 25, 26, 27, 28. The capturing ranges 17, 18, 19, 20 can have paired overlapping regions O.

In the following, for the sake of clarity, only the image processing by the computing device 12 for the camera images 23, 24 of the camera 9 is described. The explanations correspondingly apply to the remaining cameras 8, 10 and 11. The camera images 23, 24 are transformed or perspectively distorted by means of a projection P. The projection P is adapted to distort each camera image 23, 24 such that the travel ground 3 is not represented from the perspective of the camera 9, but from the desired preset perspective of the virtual plan view 15, thus from a point of view above or atop the motor vehicle 1. Such a projection can for example be performed by means of a transformation, in particular a transformation matrix. Another designation for the described projection is also rectification or geometric distortion or equalization. Methods for performing such a projection are known per se from the prior art.

From the camera image 23, 24, a transformed camera image 23', 24' is respectively generated by the projection P. The transformed camera images 23', 24' and the corresponding transformed camera images of the cameras 8, 10 and 11 can be transferred to a combining unit 29. The combining unit 29 can be adapted to combine corresponding camera images, thus camera images, which have been captured at the same point of time or within a predetermined time interval. The projection P and the combining device 29 can for example be provided as a program module of the computing device 12.

In the example, it is shown, how the transformed camera image 23' can be combined with matching, corresponding transformed camera images 21', 25', 27' to the virtual plan view 15 by superimposing or stitching. Finally, the picture 16 of the motor vehicle 1 can also be added. The finished display image 14 can then be output by means of the display device 13. The transformed camera images 21', 23', 25', 27' can have paired overlapping regions O, which correspond to the overlapping regions O of the capturing ranges 17, 18, 19, 20.

In order that the display image 14 presents a realistic plan view 15, the geometric arrangements, in particular a geometric orientation, of the cameras 8, 9, 10, 11 would have to be matched to each other. Furthermore, each camera 8, 9, 10, 11 must have a correct orientation into the environment 2, since a motion of objects recognizable in the display image 14 corresponds to the actual vehicle motion 6. Errors in the geometric orientation of the cameras 8, 9, 10, 11 can be performed for each camera respectively by adjusting or calibrating projection parameter values 30 for the projection P (in case of the camera 9) and the remaining (not illustrated) projections.

FIG. 2 shows a display image 14, as it can arise if the errors in the geometric orientation of the cameras 8, 9, 10, 11 are not compensated for. The display image 14 is illustrated. The display image 14 is exemplarily formed from the transformed camera images 21', 23', 25', 27'. By the computing device 12, a matrix or a grid pattern 31 of image blocks 32 adjoining to each other or overlapping with each other, of which only some are provided with a reference character in FIG. 2 and FIG. 3 for the sake of clarity, can be formed for each transformed camera image 21', 23', 25', 27' in the display image 14. For each image block 32, a motion vector 33 was additionally generated from two camera images 21 to 28 generated temporally consecutively by the respective camera 8, 9, 10, 11. For the sake of clarity, again, only some of the motion vectors are provided with a reference character.

The generation of motion vectors from two temporally consecutively captured camera images or transformed camera images is known per se from the prior art and for example described in WO 2012/139636 A1. The motion vectors 33 can in particular be formed based on a texture 34 of the travel ground 3 imaged in the transformed camera images 21' to 27'. In FIG. 2, it is shown that motion vectors 33 arise in straight ahead traveling along the direction of travel 6 of the vehicle 1, the direction of which is not oriented parallel to the direction of travel 6. Furthermore, differently long motion vectors 33 can arise.

In FIG. 3, the display image 14 is illustrated, as it arises after calibration of the camera system 7, that is with desired projection parameter values 30. The directional vectors 33 are oriented parallel to the direction of travel 6 and identically long. In the evaluation of the motion vectors 33, individual motion vectors can be discarded as outliers 35. In FIG. 2 and FIG. 3, only some outliers 35 are each provided with a reference character. Outliers 35 arise if the travel ground 3 is for example uneven.

The projection parameter values 30 can for example specify an installation height of the camera 9. The projection parameter values 30 can for example also specify a roll angle and/or a pitch angle and/or an inclination angle of the camera 9. For determining the projection parameter values 30 for a calibration of the camera system 7, the method illustrated in FIG. 4 can be performed.

The proposed method requires approximately straight motion and no turning and a small amount of texture on the ground surface that occurs naturally under most circumstances. Unlike other methods it does not require any particular features of interest such as corners, contours or edges to be present on the image or the tracking of such features over multiple frames. Given the required conditions it can calibrate one or more cameras simultaneously from two successive video frames. Note that in practice the current calibration is maintained as the exponentially weighted average of N previous calibrations to filter out non-permanent variations due to uneven ground or oscillations in the vehicle motion. Although the competing methods do not quote their accuracy or overall time to calibrate, it is anticipated that the present method will outperform them in speed and accuracy as it can produce reliable calibrations very quickly.

The following steps provide an interior control for the computing device 12:

S1. Perform fisheye and perspective correction and stitching of the four camera images into a single virtual plan view given the permanent intrinsic and current extrinsic calibration of all cameras (with very high tolerance to error in the rotations and/or height of each camera). This is performed for two successive frames of all cameras to obtain a pair of virtual plan views.

The image correction may be performed with a pre-computed look-up table and may incorporate an anti-aliasing filter to improve image quality and tracking performance. The zoom level (real-world units per pixel) of the generated views may be dynamically adapted to speed and/or lighting and environmental conditions to optimise tracking performance. In addition, frames may be skipped at very low speeds to increase the effective length and hence SNR of the motion vectors obtained in the next step.

S2. Optionally enhance the virtual plan view images with band-pass or high-pass spatial filtering to improve tracking performance in difficult environmental or lighting conditions.

S3. Perform motion estimation on a grid of adjacent or overlapping blocks within regions of interest (one ROI per camera) in a pair of virtual plan view images to obtain motion vectors for each camera. Block matching may not be attempted for some or all blocks if the dispersion of the pixel intensities of these blocks is below some threshold i.e. the blocks represent a texture-less surface such as a very dark or overexposed portion in the image. Block matching may be achieved with typical block matching algorithms (BMAs) used also in motion estimation for video-compression and may be assisted with odometric data from the CAN bus for more efficient search prediction. Typical block similarity measures (BDMs) may be used such as the sum of absolute differences (SAD) or the sum of the squared differences (SSD) between the pixels of the reference block in one frame and the pixels of the nominated search area in the next frame.

S4. Reject obvious outliers based on the local spatial uniformity of the motion field i.e. discard motion vectors that according to some similarity measure deviate from their neighbors by more than some tolerance. We define as "outliers" any inconsistent vectors that occur either due to false matches or due to genuine matches of false objects such as moving objects, objects with height or uneven ground.

S5. Evaluate the current calibration quality of each camera independently via a cost function derived from simple geometric properties of the motion vectors on the ground plane. Preferably these geometric properties satisfy straight vehicle motion which can be indicated to the algorithm via relevant CAN signals or by additional processing of the motion vectors to detect vehicle turning.

A simple heuristic method for detecting the amount of turning from the mirror cameras is to fit a line to the data points obtained from the motion vector y-components and their horizontal position on the image (or equivalently their column index on the grid). The slope of this line is representative of the amount of vehicle tuning.

For straight vehicle motion, a fully calibrated system should produce motion vectors on the virtual plan view free from perspective distortions i.e. parallel to the image scan line and of equal length among all cameras (FIG. 6). That is, the sum of the absolute y-components and the variance of the absolute x-components of all motion vectors should be both zero. This can be also expressed as the sum of squared residuals (SSE) from zero and from the mean respectively and may take derivative forms such as the mean squared error (MSE) or root mean square error (RMSE).

FIG. 5 and FIG. 6 show perspectively distorted (FIG. 5) versus undistorted/calibrated motion vectors (FIG. 6). For a set of motion vectors $\{V1, V2, V3, \ldots, Vn\}$ with weights $\{W1, W2, W3, \ldots, Wn\}$, with $$Vi = \begin{bmatrix} Xi \\ Yi \end{bmatrix}$$

the weighted mean $\overline{X}$ of the x-components $Xi$ is $$\overline{X} = \frac{\sum_{i=1}^{n} WiXi}{\sum_{i=1}^{n} Wi}.$$

The sum of squared errors to be minimized is $$SSE = \sum_{i=1}^{n} WiYi^2 + \sum_{i=1}^{n} Wi(Xi - \overline{X})^2 = \sum_{i=1}^{n} Wi(Yi^2 + (Xi - \overline{X})^2).$$

And the root mean square calibration error is $$RMSE = \sqrt{\frac{\sum_{i=1}^{n} Wi(Yi^2 + (Xi - \overline{X})^2)}{\sum_{i=1}^{n} Wi}}.$$

The lower this error, the better the calibration is and by implication the stitching quality of the virtual plan-view. In practice, this error incorporates noise from various sources therefore it can never be absolute zero except in simulated ideal conditions.

The calibration error is inverted, normalized to a particular range (0 through 100) and filtered via an exponential moving average IIR filter to obtain a stable indicator of the current calibration quality per camera for self-diagnosis and triggering of the calibration process. The filter's smoothing factor determines the sensitivity of the calibration trigger. This signal is continuously monitored (repeat steps S1 to S5) until it falls below some hysteresis threshold in which case the calibration process is initiated in the next step and repeated until the quality reaches some satisfactory level.

Note that the calibration quality converges asymptotically to a steady state over multiple calibration cycles due to the exponential smoothing applied in both the calibration result (later) and itself. In practice, given the right conditions, the steady state is achieved very quickly due to the capability of the system to produce one calibration for each pair of frames.

S6. Calibrate the orientation (pitch-yaw-roll) of each camera independently by minimizing a cost function similar with the one used in the previous step to evaluate the calibration error. Optimization is performed in a least-squares sense by minimizing the sum of the squared residuals of the re-projected motion vectors onto the ground plane. Time delays converted to spatial offsets may be incorporated in the computation of the cost function to neutralize the effect of the rolling shutter.

S7. Re-project all motion vectors onto the ground plane using the calibrated orientation of each camera for further processing. Note that neither the virtual plan view nor the block matched motion vectors need to be recomputed at this stage as we can apply the calibration correction directly to the existing vectors. Image processing is performed only at the start of each calibration cycle.

S8. Examine the residual errors and the statistical distributions or clustering of the components of the re-projected motion vectors to detect the presence of kerbs or other large objects with height in the image. Such objects can degrade the accuracy of the calibration due to the assumption that all vectors lie on the ground plane. If the detection is positive, discard the entire set of motion vectors and start over from step 1 with new frames. Alternatively keep the dominant cluster and proceed to the next step.

Note that the calibration result from step 6 will be naturally affected by the presence of kerbs or similar objects in the image. For straight kerbs splitting the image in two halves, calibration error will be manifested primarily in the camera rotation about the vehicle longitudinal axis (direction of motion) diluting to some extent the bi-modal clustering of the motion vectors. In most cases this does not prevent detection. Alternatively, a more advanced cost function may be employed to neutralize the effect of kerbs or intense road camber. Such a cost function may incorporate a curvature model for the ground surface or assume two different ground levels when computing the residual errors of motion vectors.

S9. Reevaluate the cost function for the remaining vectors and remove those that contribute residual error above some threshold to further reduce sporadic outliers. Repeat the calibration in step S6 and then proceed to the next step. Alternatively repeat steps S6, S7, (S8) and S9 until no more outliers can be removed provided that the number of usable vectors remains above some threshold. Alternatively the full RANSAC (Random Sample Consensus) algorithm can be employed without removing any outliers in the outlier rejection step (S4) or during calibration (S9). In addition, multiple correlation peaks from the block matching step (S3) can be incorporated into RANSAC as independent observations with each block potentially producing more than one motion vector.

S10. Compute the absolute height of each camera independently using odometric data from other sensors such as the vehicle speed or wheel RPM (Rounds Per Minute) published on the CAN or FlexRay bus. Alternatively if such data is not available or inaccurate, compute offsets from the nominal default camera heights by considering that the cameras are mounted on a the vehicle chassis (rigid body) and that their movement is constrained by the movement of the vehicle chassis from the suspensions. Note that calibrating the orientation of each camera does not require prior knowledge of its height whereas calibrating height requires precise knowledge of the orientation.

S11. Apply exponential smoothing to the calibrated extrinsic values in order to suppress observation noise, vehicle oscillations and temporary effects due to uneven ground or undetected outliers. A final sanity check may also be performed to ensure that the calibration result is within some reasonable tolerance. The filtered values are fed into the system to be used as the current calibration for image correction at the beginning of the next calibration cycle and all subsequent processing.

Note that at the start of each calibration cycle the virtual plan view is updated from the result of the last calibration. Therefore the perspective error is progressively reduced until the calibration converges asymptotically to a steady state. The improved image correction at each cycle also improves the block matching performance due to the higher similarity of the matched blocks.

Although the above algorithm provides sufficient calibration accuracy for most applications, it may be adapted to further optimize the stitching accuracy of the virtual plan view by considering image data near or at the overlapping regions between cameras. The different viewpoints and reduction of the effective resolution in these areas make block matching more difficult. However, the calibration result obtained from the first part of the algorithm provides a very good starting point to the proposed methods. Filtering the corrected images to enhance medium frequency detail and suppress noise may improve significantly the block matching performance in this scenario.

In der beschriebenen implementation, the visual discrepancy in the stitching areas is minimized by modifying the camera heights, rotations and potentially the X-Y positions or any useful combination of the extrinsic parameters of one or more cameras simultaneously. In the simplest only the camera heights are modified. Optimization may be performed in a least-square sense by minimizing a sum of squared residuals (geometric errors) and similar outlier rejection and filtering mechanisms may be applied as before. The following methods are proposed:

S12.1 Perform block matching across cameras near the stitching line to obtain "inter-camera" motion vectors. Then optimize the extrinsic parameters of one or more cameras to make these vectors parallel to direction of motion. This will ensure optimal stitching accuracy in the transverse direction (perpendicular to the direction of motion).

S12.2 Perform block matching in the overlap region O' (FIG. 2) shared between two cameras to obtain the location of common features (texture blocks). Then optimize the extrinsic parameters of one or more cameras by minimizing the geometric error between the re-projection of these features on the ground plane from their respective cameras.

S12.3 Optimize the extrinsic parameters of one or more cameras while re-computing the image correction at the overlap region O' for each camera involved, to obtain the best correlation for each overlapping image pair. Correlation may be performed between two large rectangular blocks of texture within the overlap region. A dedicated optimization algorithm can be used or exhaustive search of one or two parameters within some predefined range. For each trial calibration a new correlation must be performed between the two blocks.

The invention claimed is:
1. A method for calibrating a camera system of a motor vehicle, wherein at least one camera of the camera system sequentially generates camera images respectively from an environment of the motor vehicle and a processor of the camera system respectively generates a virtual plan view of the environment from a predetermined virtual perspective, from the camera images by means of a projection, the method comprising:
- a) recognizing, by the processor, a straight vehicle motion of the motor vehicle along a predetermined direction of motion;
- b) passing, at least once, with recognized travel along the predetermined direction of motion and by the processor, a calibration cycle for each camera, wherein for the calibration cycle, the processor performs the following steps:
  - transforming camera images of the camera based on current projection parameters of the projection;
  - determining motion vectors in the virtual plan view based on the transformed camera images;
  - for at least one geometric characteristic of the motion vectors selected from a group consisting of a length and a direction, setting a respective reference value depending on a direction of motion;
  - determining an error value from a difference between the at least one geometric characteristic of the motion vectors and the respective corresponding reference value; and
  - determining new projection parameters from the current projection parameters depending on the error value,
  - wherein in each calibration cycle, the error value is iteratively reduced by determining intermediate projection parameters depending on the error value and newly orienting only the motion vectors in the virtual plan view based on the intermediate projection parameters by newly transforming by means of the projection, until the error value satisfies a predetermined optimization criterion; and
  - wherein for a y component of each motion vector oriented parallel to a transverse axis of the vehicle, the y reference value zero is set, and for an x component oriented parallel to a longitudinal axis of the vehicle, an average value of all of the x components of the motion vectors is set as an x reference value, and a sum of squared differences is formed as the error value.

2. The method according to claim 1, wherein at least one spatial orientation of the at least one camera selected from a group consisting of: a pitch angle, yaw angle, roll angle, and an installation height of the camera on the motor vehicle is described by the new projection parameters.

3. The method according to claim 1, wherein the at least one camera captures a travel ground as the environment and the motion vectors are determined based on a texture of the travel ground.

4. The method according to claim 1, wherein multiple motion vectors are determined by dividing each transformed camera image into a matrix of image blocks adjacent to each other or overlapping and determining one motion vector for each image block.

5. The method according to claim 1, wherein a straight-ahead travel is recognized as travel along the direction of motion, and as the geometric characteristic, it is checked if the motion vectors are disposed parallel to each other and/or parallel to an image edge of the virtual plan view and/or identically long.

6. The method according to claim 1, wherein for selecting two camera images from an image sequence of the respective camera, at least one camera image is skipped between a first one of the two camera images and a second one of the two camera images.

7. The method according to claim 1, wherein at least one of the motion vectors, in which a contribution to the error value is greater than a predetermined maximum value and/or which violates a similarity criterion with respect to the remaining motion vectors, is deleted from the motion vectors as an outlier.

8. The method according to claim 1, further comprising:
performing multiple calibration cycles;
for each calibration cycle, determining new projection parameters, respectively;
combining corresponding new projection parameters from different calibration cycles to a respective averaged projection parameter; and
using the averaged projection parameters as a basis for current projection parameters of the projection in a respectively next calibration cycle.

9. The method according to claim 1, further comprising:
performing multiple calibration cycles; and
from the error value of one of the calibration cycles and a respective error value of at least one prior calibration cycle, determining an average error value, wherein the new projection parameters are only determined if the average error value is greater than a predetermined threshold value.

10. The method according to claim 1, further comprising:
generating, by multiple cameras, camera images; and
matching the motion vectors formed to each of the cameras to each other by adjusting an installation height of at least one of the cameras as a projection parameter.

11. The method according to claim 1, further comprising:
generating, by a first and a second camera, camera images; determining an overlap error value in the transformed camera images of the two cameras; and determining the new projection parameters for the first and/or the second camera depending on the overlap error value, wherein:
- a) at least one inter-camera motion vector is determined depending on one of the transformed camera images of the first camera image and one of the transformed camera images of the second camera and the overlap error value is formed depending on at least one geometric characteristic of the at least one inter-camera motion vector, or
- b) in an overlapping region an image block is determined in one of the transformed camera images of the first camera and a corresponding image block is determined in one of the transformed camera images of the second camera and the overlap error value is determined depending on a distance of the two image blocks, or
- c) in an overlapping region a correlation value is generated from one of the transformed camera images of the first camera and one of the transformed camera images of the second camera in the overlapping region and a the comparative value is used as the overlap error value.

12. A camera system for a motor vehicle, comprising:
at least one camera for respectively generating an image sequence from camera images of an environment of the motor vehicle; and
a processor configured to respectively generate a transformed camera image with a virtual plan view of the environment from a predetermined virtual perspective, from the camera images by means of a projection; and a display screen that displays the transformed camera images as a composed all-around view around the motor vehicle, wherein the processor performs a method according to claim 1.

13. A motor vehicle with a camera system according to claim 12, wherein:

the camera system has multiple cameras;

a capturing range of a first one of the multiple cameras is oriented to a first lateral region beside the motor vehicle;

a capturing range of a second one of the multiple cameras is oriented to a second lateral region opposing the first lateral region beside the motor vehicle;

a capturing range of a third one of the multiple cameras is oriented to a front region in front of the motor vehicle; and a capturing range of a fourth one of the multiple cameras is oriented to a rear region behind the motor vehicle, wherein the camera system is configured to generate a respective transformed camera image from each one of the camera images of each camera and an all-around view from each one of the camera images, and to display the all-around view via the display screen.

\* \* \* \* \*